(12) United States Patent
Qi et al.

(10) Patent No.: US 9,672,830 B2
(45) Date of Patent: Jun. 6, 2017

(54) VOICE SIGNAL ENCODING AND DECODING METHOD, DEVICE, AND CODEC SYSTEM

(71) Applicant: Huawei Technologies Co., Ltd., Shenzhen, Guangdong (CN)

(72) Inventors: Fengyan Qi, Beijing (CN); Lei Miao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 192 days.

(21) Appl. No.: 13/632,905

(22) Filed: Oct. 1, 2012

(65) Prior Publication Data

US 2013/0028191 A1 Jan. 31, 2013

Related U.S. Application Data

(63) Continuation of application No. PCT/CN2011/072570, filed on Apr. 9, 2011.

(30) Foreign Application Priority Data

Apr. 9, 2010 (CN) .......................... 2010 1 0147586

(51) Int. Cl.
*G10L 19/00* (2013.01)
*G10L 19/24* (2013.01)
*H04B 7/06* (2006.01)

(52) U.S. Cl.
CPC .......... *G10L 19/0017* (2013.01); *G10L 19/24* (2013.01); *H04B 7/0647* (2013.01)

(58) Field of Classification Search
None
See application file for complete search history.

(56) References Cited

U.S. PATENT DOCUMENTS 6,226,616 B1 5/2001 You et al.
2003/0170934 A1* 9/2003 Lin ............................... 438/118
(Continued)

FOREIGN PATENT DOCUMENTS

CN 1357136 A 7/2002
CN 1650348 A 8/2005
(Continued)

OTHER PUBLICATIONS

Sasaki et al. (Global Standard for Wideband Speech Coding: ITU-T G.711.1, Aug. 2008, vol. 6, No. 8, all pages).*
(Continued)

*Primary Examiner* — Chirag Shah
*Assistant Examiner* — Srinivasa Reddivalam

(57) ABSTRACT

A voice signal encoding and decoding method, device, and codec system are provided. The coding method includes: encoding an input voice signal to obtain a broadband code stream, where the broadband code stream includes a core layer bit stream and an extension enhancement layer bit stream (101); compressing the core layer bit stream to obtain a compressed code stream (102); and packing the compressed code stream and the extension enhancement layer bit stream to obtain a packed code stream (103). The core layer bit stream is compressed, and the compressed code stream and the extension enhancement layer bit stream are packed, thereby reducing transmission bandwidth occupied by the input voice signal. Since the broadband voice encoding is performed on the input voice signal, a broadband voice code stream is transmitted by using narrowband transmission bandwidth, thereby improving the cost performance of voice signal transmission.

7 Claims, 10 Drawing Sheets

(56) References Cited

U.S. PATENT DOCUMENTS

| | | | |
|---|---|---|---|
| 2003/0171919 A1* | 9/2003 | Kim | G10L 19/0017 704/229 |
| 2003/0171934 A1* | 9/2003 | Zhang | G10L 19/24 704/500 |
| 2003/0214968 A1* | 11/2003 | Chen | H04N 7/17309 370/441 |
| 2004/0028227 A1* | 2/2004 | Yu | 380/201 |
| 2005/0240414 A1 | 10/2005 | Tominaga | |
| 2006/0080094 A1* | 4/2006 | Katayama et al. | 704/229 |
| 2006/0109864 A1* | 5/2006 | Oksman | H04L 7/041 370/474 |
| 2006/0171373 A1 | 8/2006 | Li | |
| 2007/0043575 A1 | 2/2007 | Onuma et al. | |
| 2007/0133458 A1* | 6/2007 | Chandra et al. | 370/329 |
| 2007/0274383 A1 | 11/2007 | Yu et al. | |
| 2007/0276655 A1 | 11/2007 | Lee et al. | |
| 2007/0291836 A1* | 12/2007 | Shi | H04N 21/234381 375/240.01 |
| 2008/0232261 A1* | 9/2008 | Tsuzaki et al. | 370/250 |
| 2008/0261531 A1 | 10/2008 | Huang et al. | |
| 2009/0094023 A1* | 4/2009 | Sung et al. | 704/219 |
| 2009/0138272 A1 | 5/2009 | Kim et al. | |
| 2009/0259477 A1* | 10/2009 | Ashley | G10L 19/24 704/500 |
| 2009/0306993 A1 | 12/2009 | Wuebbolt et al. | |
| 2010/0169087 A1* | 7/2010 | Ashley et al. | 704/225 |
| 2010/0217609 A1 | 8/2010 | Oshikiri | |
| 2011/0076999 A1* | 3/2011 | Kazmi et al. | 455/423 |
| 2011/0205978 A1* | 8/2011 | Nory et al. | 370/329 |
| 2011/0242982 A1* | 10/2011 | Lunttila et al. | 370/241 |
| 2012/0057547 A1* | 3/2012 | Lohr et al. | 370/329 |
| 2012/0106450 A1* | 5/2012 | Golitschek Edler Von Elbwart et al. | 370/328 |
| 2012/0182958 A1* | 7/2012 | Pelletier et al. | 370/329 |
| 2012/0250559 A1* | 10/2012 | Wu et al. | 370/252 |

FOREIGN PATENT DOCUMENTS

| | | |
|---|---|---|
| CN | 1890711 A | 1/2007 |
| CN | 1905010 A | 1/2007 |
| CN | 101090273 A | 12/2007 |
| CN | 101490748 A | 7/2009 |
| CN | 101511017 A | 8/2009 |
| CN | 101964188 A | 2/2011 |
| EP | 1104176 A2 | 5/2001 |
| JP | 2005286863 | 10/2005 |
| WO | WO 03/092167 A1 | 11/2003 |
| WO | WO 2008/062153 A2 | 5/2008 |

OTHER PUBLICATIONS

International Search Report dated Jul. 14, 2011 in connection with International Patent Application No. PCT/CN2011/072570.
International Written Opinion dated Jul. 14, 2011 in connection with International Patent Application No. PCT/CN2011/072570, 8 pages.
Partial Translation of Chinese Search Report in connection with Chinese application 201010147586.6, 7 pages.
International Telecommunication Union; Telecommunication Standarization Sector; Oct. 2009; Proposal on a new Annex to G.711.1: use of lossless compression for core bitstream; 3 pages.

* cited by examiner

VOICE SIGNAL ENCODING AND DECODING METHOD, DEVICE, AND CODEC SYSTEM

CROSS-REFERENCE TO RELATED APPLICATIONS

This application is a continuation of International Application No. PCT/CN2011/072570, filed on Apr. 9, 2011, which claims priority to Chinese Patent Application No. 201010147586.6, filed on Apr. 9, 2010, both of which are hereby incorporated by reference in their entireties.

TECHNICAL FIELD

Embodiments of the present invention relate to the field of audio processing technologies, and in particular, to a voice signal encoding and decoding method, device, and codec system.

BACKGROUND

In real-time voice network transmission, in order to improve voice quality, a real-time voice transmission system needs to select a suitable voice compression algorithm and a transmission method according to indexes, such as an actual application network capability and transmission bandwidth, delay, complexity, and voice quality, so as to improve the cost performance of voice signal transmission as much as possible.

In numerous voice codecs, G.711 is widely applied in an actual application due to advantages, such as a simple algorithm, strong robust, and short delay. The international telecommunication union telecommunication standardization sector (ITU Telecommunication Standardization Sector, ITU-T) proposes two extended voice encoder standards, G.711.1 and G.711.0, based on the narrowband voice encoder G.711. In G.711.1, broadband extension is performed based on the G.711 narrowband to implement broadband voice quality. In G.711.0, lossless compression is performed on a G.711 code stream to reduce transmission bandwidth by about 50%, thereby improving transmission quality of a voice signal during network congestion.

During implementation of the present invention, the inventor finds that, G.711.1 and G.711.0 in the prior art cannot reduce the transmission bandwidth and improve the voice quality at the same time.

SUMMARY

Embodiments of the present invention provide a voice signal encoding and decoding method, device, and codec system, to improve the cost performance of voice signal transmission.

An embodiment of the present invention provides a voice signal encoding method, where the method includes:

encoding an input voice signal to obtain a broadband code stream, where the broadband code stream includes a core layer bit stream and an extension enhancement layer bit stream;

compressing the core layer bit stream to obtain a compressed code stream; and packing the compressed code stream and the extension enhancement layer bit stream to obtain a packed code stream.

An embodiment of the present invention provides a voice signal encoding device, where the device includes:

a first processing module, configured to encode an input voice signal to obtain a broadband code stream, where the broadband code stream includes a core layer bit stream and an extension enhancement layer bit;

a second processing module, configured to compress the core layer bit stream to obtain a compressed code stream; and a third processing module, configured to pack the compressed code stream and the extension enhancement layer bit stream to obtain a packed code stream.

An embodiment of the present invention provides a voice signal decoding method, where the method includes:

acquiring header information in a packed code stream;

unpacking the packed code stream according to the header information, to obtain an extension enhancement layer bit stream and a compressed core layer bit stream;

decompressing the compressed core layer bit stream to obtain a decompressed code stream; and performing decoding reestablishment on the extension enhancement layer bit stream and the decompressed code stream, to obtain a broadband reestablished voice signal.

An embodiment of the present invention provides a voice signal decoding device, where the device includes:

an acquisition module, configured to acquire header information in a packed code stream;

an unpacking module, configured to unpack the packed code stream according to the header information, to obtain an extension enhancement layer bit stream and a compressed core layer bit stream;

a decompression module, configured to decompress the compressed core layer bit stream to obtain a decompressed code stream; and a reestablishment module, configured to perform decoding reestablishment on the extension enhancement layer bit stream and the decompressed code stream, to obtain a broadband reestablished voice signal.

An embodiment of the present invention provides a voice signal codec system, including a voice signal encoding device and a voice signal decoding device, where the voice signal encoding device is configured to: encode an input voice signal to obtain a broadband code stream, where the broadband code stream includes a core layer bit stream and an extension enhancement layer bit stream; compress the core layer bit stream to obtain a compressed code stream; pack the compressed code stream and the extension enhancement layer bit stream to obtain a packed code stream; and send the packed code stream to the voice signal decoding device; and the voice signal decoding device is configured to: acquire header information from the packed code stream sent by the voice signal encoding device; unpack the packed code stream according to the header information to obtain the extension enhancement layer bit stream and the compressed core layer bit stream; decompress the compressed core layer bit stream, to obtain a decompressed code stream; perform decoding reestablishment on the extension enhancement layer bit stream and the decompressed code stream, to obtain a broadband reestablished voice signal.

In the voice signal encoding and decoding method, device, and codec system provided by the embodiments of the present invention, the core layer bit stream is compressed, and the compressed code stream and the extension enhancement layer bit stream are packed, thereby reducing transmission bandwidth occupied by the input voice signal. Since the broadband voice encoding is performed on the input voice signal, a broadband voice code stream is transmitted by using narrowband transmission bandwidth, thereby improving the cost performance of voice signal transmission.

DETAILED DESCRIPTION

The technical solutions according to embodiments of the present invention will be clearly and completely described below with reference to the accompanying drawings in the embodiments of the present invention. It is obvious that the embodiments to be described are only a part rather than all of the embodiments of the present invention. All other embodiments obtained by persons skilled in the art based on the embodiments of the present invention without creative efforts shall fall within the protection scope of the present invention.

In the embodiments of the present invention, if a sampling rate of a voice signal is 8 kHz, the voice signal is a narrowband signal; if a sampling rate of a voice signal is higher than 8 kHz, the voice signal is a broadband signal. Moreover, the narrowband signal and the broadband signal are relative concepts and are not intended to limit the embodiments of the present invention according to the sampling rate of 8 kHz.

Figure 1:
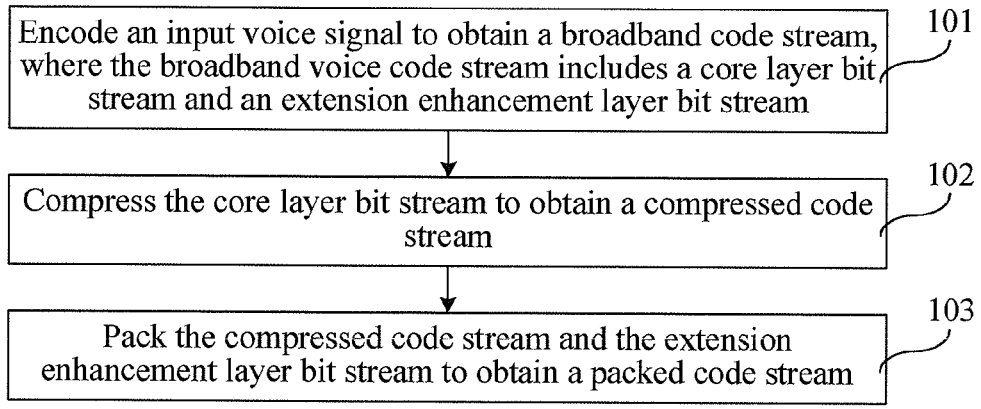
FIG. 1 is a schematic flow chart of an embodiment of a voice signal encoding method of the present invention.

FIG. 1 is a schematic flow chart of an embodiment of a voice signal encoding method of the present invention. As shown in FIG. 1, the embodiment of the present invention includes the following steps.

Step 101: Encode an input voice signal to obtain a broadband code stream, where the broadband voice code stream includes a core layer bit stream and an extension enhancement layer bit stream.

Step 102: Compress the core layer bit stream to obtain a compressed code stream.

Step 103: Pack the compressed code stream and the extension enhancement layer bit stream to obtain a packed code stream.

In the voice signal encoding method provided by the embodiment of the present invention, the core layer bit stream is compressed, and the compressed code stream and the extension enhancement layer bit stream are packed, thereby reducing transmission bandwidth occupied by the input voice signal. Since broadband voice encoding is performed on the input voice signal, a broadband voice code stream is transmitted by using narrowband transmission bandwidth, thereby improving the cost performance of voice signal transmission.

Figure 2:
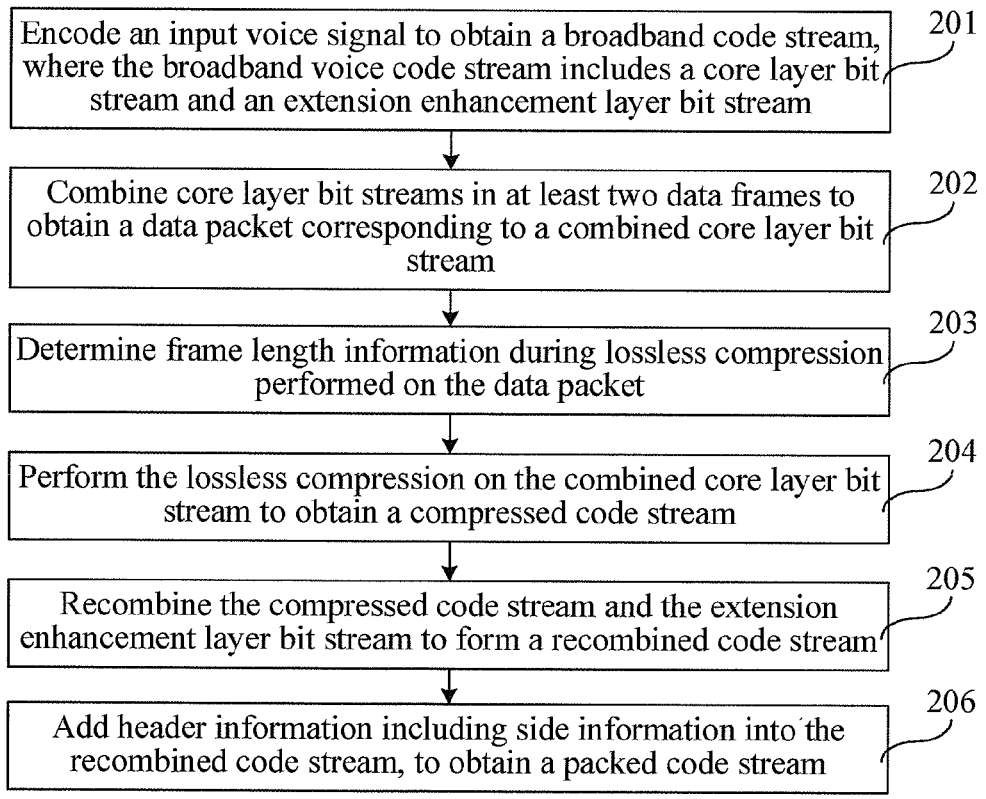
FIG. 2 is a schematic flow chart of another embodiment of a voice signal encoding method of the present invention.

FIG. 2 is a schematic flow chart of another embodiment of a voice signal encoding method of the present invention. As shown in FIG. 2, the embodiment of the present invention includes the following steps.

Step 201: Encode an input voice signal to obtain a broadband code stream, where the broadband voice code stream includes a core layer bit stream and an extension enhancement layer bit stream.

The core layer bit stream may be specifically a narrowband voice code stream. The narrowband voice code stream is obtained by encoding a narrowband signal. The extension enhancement layer bit stream may specifically include a narrowband enhancement bit stream and/or a broadband enhancement bit stream. The narrowband enhancement bit stream is specifically an enhancement bit stream with narrowband voice encoding quality. The broadband enhancement bit stream is specifically an enhancement bit stream with broadband voice encoding quality. Specifically, if the input voice signal is encoded by using a G.711.1 encoder to obtain a broadband code stream, the core layer bit stream is specifically a G.711 bit stream (bits) and the extension enhancement layer bit stream is a G.711.1 extension bit stream (ext bits).

Step 202: Combine core layer bit streams in at least two data frames to obtain a data packet corresponding to a combined core layer bit stream.

Specifically, if the input voice signal is encoded through the G.711.1 encoder to obtain the broadband code stream in step 201, since a core layer code stream is specifically a G.711 bit stream (bits), step 202 is specifically: combine G.711 bit streams (bits) in at least two frames to obtain a data packet of more than at least two data frames formed through combination.

Step 203: Determine frame length information during lossless compression performed on the data packet.

Specifically, the frame length information during the lossless compression performed on the data packet may be determined in the following three manners.

In a first manner, if a packet length of the data packet to be processed is less than or equal to a longest frame length during the lossless compression, the determining the frame length information during the lossless compression performed on the data packet is: if the packet length of the data packet is equal to an available frame length during the lossless compression, determining that a frame length during the lossless compression is the packet length of the data packet; if the packet length of the data packet is not equal to an available frame length during the lossless compression, determining that the frame during the lossless compression is a longest available frame length less than the packet length of the data packet to be processed.

If a packet length of the data packet to be processed is greater than a longest frame length during the lossless compression, the determining the frame length information during the lossless compression performed on the data packet is: determining that a frame length processed currently is the longest frame length during the lossless compression; or determining that a frame length processed currently is a second longest frame length corresponding to the longest frame length during the lossless compression.

In a second manner, a frame length of a first frame during the lossless compression is determined. If the packet length of the data packet is an integral multiple of the frame length of the first frame, it is determined that the frame length of the remaining frames during the lossless compression is the frame length of the first frame.

When the packet length of the data packet is not an integral multiple of the frame length of the first frame, if a packet length of the data packet to be processed is greater than or equal to the frame length of the first frame, a frame length processed currently is equal to the frame length of the first frame; if a packet length of the data packet to be processed is less than the frame length of the first frame, a frame length processed currently is a longest available frame length less than the packet length of the data packet to be processed.

In a third manner, the frame length information during the lossless compression performed on the data packet is determined by combining the foregoing two manners. Definitely, the foregoing three manners are specifically described as examples only and are not intended to limit the manner of determining the frame length information during the lossless compression in the embodiment of the present invention.

Step 204: Perform the lossless compression on the combined core layer bit stream to obtain a compressed code stream.

In step 204, if the lossless compression is performed on the combined core layer bit stream by using a G.711.0 encoder to obtain the compressed code stream, the compressed code stream is specifically a G.711.0 bit stream (bits).

Moreover, in step 202 to step 204, in the case in which core layer bit streams of multiple data frames are packed into a data packet, frame length information during lossless compression performed on the data packet can be flexibly determined according to a type of a voice transmission network and/or a type of the input voice signal.

Step 205: Recombine the compressed code stream and the extension enhancement layer bit stream to form a recombined code stream.

Specifically, extension enhancement layer bit streams of all frames are recombined, and the extension enhancement layer bit stream after the recombination is set behind the compressed code stream to form a recombined code stream.

Step 206: Add header information including side information into the recombined code stream, to obtain a packed code stream.

In an actual application, the side information may include packet header information in the real-time transport protocol (Real-time Transport Protocol, RTP), or may include payload header information (Payload Header) in the RTP. The payload header information may be encoding mode information of the G.711.1. Moreover, the side information may also include information that can be used for calculating the packet length pl of the data packet, the number N of frames during the lossless compression performed by a lossless compressor, and a frame length fl during the lossless compression.

In the voice signal encoding method provided by the embodiment of the present invention, the core layer bit stream is compressed, and the compressed code stream and the extension enhancement layer bit stream are packed, thereby reducing transmission bandwidth occupied by the input voice signal. Since the broadband voice encoding is performed on the input voice signal, a broadband voice code is transmitted by using narrowband transmission bandwidth, thereby improving the cost performance of voice signal transmission.

In order to understand the technical solution of the embodiment shown in FIG. 2 more clearly, the technical solution of the embodiment shown in FIG. 2 is exemplified below through an example that broadband encoding is performed through the G.711.1 encoder and the lossless compression is performed through the G.711.0 encoder.

In step 202, if the packet length of the data packet corresponding to the combined core layer bit stream is pl and the frame length during the lossless compression is fl, all combinations for implementing that a sum of frame lengths of all data frames in the data packet is equal to the packet length pl may be combination manners in this embodiment, that is, all combinations of $fl_n$ which satisfy $$pl = \sum_{n=1}^{N} fl_n,$$

where N is the number of frames that can be processed in a data packet and varies with the selection of different combinations of $fl_n$. For example, during the lossless compression, the G.711.0 encoder is adopted to perform combination on a 35 ms data packet to make a packet length as pl, and the combination manners are as follows:

pl=$fl_1$+$fl_2$, where $fl_1$=30,$fl_2$=5,$N$=2; or pl=$fl_1$+$fl_2$+$fl_3$, where $fl_1$=20,$fl_2$=10,$fl_3$=5,$N$=3; or

. . .

pl=$fl_1$+ . . . +$fl_7$, where $fl_1$=5,$fl_2$=5,$fl_3$=5,$fl_4$=5,$fl_5$=5, $fl_6$=5,$fl_7$=5,$N$=7.

Furthermore, based on the foregoing allowable combination manners, the header information needs to be adaptively modified with different combination manners, and may also include information that can be used for calculating the packet length pl and the number N of frames, so that a receiving end performs corresponding decoding processing according to the side information.

In step 203, if the G.711.0 encoder is adopted to compress the core layer bit stream, since the frame lengths that can be processed when the G.711.0 encoder performs the lossless compression are 5 ms, 10 ms, 20 ms, 30 ms, and 40 ms, the longest frame length in the embodiment of the present invention is 40 ms, and available frame lengths are 5 ms, 10 ms, 20 ms, 30 ms, and 40 ms. If the packet length of the data packet is less than or equal to 40 ms and the packet length of the data packet is equal to an available frame length during the lossless compression, it is determined that the frame length during the lossless compression is the packet length of the data packet. If the packet length of the data packet is not equal to an available frame length during the lossless compression, it is determined that the frame length processed currently is the longest available frame length less than the packet length of the data packet to be processed. An example that a length of the data packet to be processed is 35 ms is taken for description. According to limitation of the foregoing conditions, since 35 ms is not the available frame length of the G.711.0 encoder, it is determined that the frame length processed currently is 30 ms. In this case, 30 ms is the longest available frame length in the embodiment of the present invention. If the packet length of the data packet to be processed is greater than 40 ms during the lossless compression, it is determined that the frame length processed currently is the longest frame length during the lossless compression, or it is determined that the frame length processed currently is the second longest frame length corresponding to the longest frame length during the lossless compression.

Alternatively, step 203 in which the G.711.0 encoder is adopted to compress the core layer bit stream may also be implemented in the following manners.

If the packet length of the data packet is less than or equal to 40 ms, the determining the frame length information during the lossless compression performed on the data packet is: determining that the frame length during the lossless compression is the packet length of the data packet, or shown in the formula $$fl_{1pl\leq 40}(pl) = \begin{cases} pl, N = 1, \text{ if } pl = 5, 10, 20, 30, 40 \\ pl - 5, N = 2, \text{ if } pl < 40 \text{ and } pl \neq 5, 10, 20, 30 \end{cases}.$$

If a packet length of the packed data packet is greater than 40 ms, a frame length of a first frame of the packed data packet is $$fl_{1pl>40} = \begin{cases} 30, N = \left\lfloor \frac{pl}{30} \right\rfloor + fl_{1pl\leq 40}\left(pl - \left\lfloor \frac{pl}{30} \right\rfloor \times 30\right) \\ 40, N = \left\lfloor \frac{pl}{40} \right\rfloor + fl_{1pl\leq 40}\left(pl - \left\lfloor \frac{pl}{40} \right\rfloor \times 40\right) \end{cases},$$

where $\lfloor . \rfloor$ is a round-down operator; a frame length of a second frame is 5 ms and a frame length of a third frame is 5 ms.

Alternatively, step 203 in which the G.711.0 encoder is adopted to compress the core layer bit stream may also be implemented in the following manner: after determining that the frame length of the first frame during the lossless compression is $fl_1$, determining a frame length, which is to be processed subsequently, according to $$\begin{cases} \text{when } pl \text{ can be divided exactly by } fl_1 : N = \frac{pl}{fl_1}; \\ fl_n = fl_1, n \in [1, N]; \\ \text{when } pl \text{ cannot be divided exactly by } fl_1 : \\ N = \left\lfloor \frac{pl}{fl_1} \right\rfloor + fl_{1pl<=40}\left(\left(pl - \left\lfloor \frac{pl}{fl_1} \right\rfloor \Box fl_1\right)\right); \\ fl_n = fl_1, n \in \left[1, \left\lfloor \frac{pl}{fl_1} \right\rfloor\right]; \\ fl_n = fl_{1pl<=40}\left(\left(pl - \left\lfloor \frac{pl}{fl_1} \right\rfloor \Box fl_1\right)\right), n \in \left[\left\lfloor \frac{pl}{fl_1} \right\rfloor + 1, N\right]; \end{cases}.$$

Moreover, the frame length information during the lossless compression performed on the data packet may also be determined by combining the foregoing two manners. Definitely, the foregoing three manners are specifically described as examples only and are not intended to limit the manner of determining the frame length information during the lossless compression in the embodiment of the present invention.

Based on the embodiments shown in FIG. 1 and FIG. 2, the packed voice code stream may also be sent to a transmission network or a storage.

Figure 3:
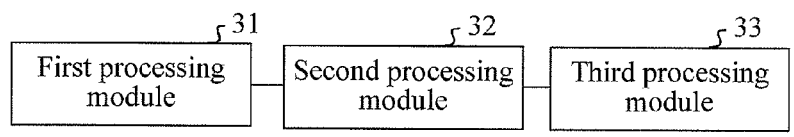
FIG. 3 is a schematic structural diagram of an embodiment of a voice signal encoding device of the present invention.

FIG. 3 is a schematic structural diagram of an embodiment of a voice signal encoding device of the present invention. As shown in FIG. 3, this embodiment includes a first processing module 31, a second processing module 32, and a third processing module 33.

The first processing module 31 encodes an input voice signal to obtain a broadband code stream, where the broadband code stream includes a core layer bit stream and an extension enhancement layer bit stream. The second processing module 32 compresses the core layer bit stream to obtain a compressed code stream. The third processing module 33 packs the compressed code stream and the extension enhancement layer bit stream to obtain a packed code stream.

In the voice signal encoding device provided by the embodiment of the present invention, the second processing module 32 compresses the core layer bit stream, and the third processing module 33 packs the compressed code stream and the extension enhancement layer bit stream, thereby reducing transmission bandwidth occupied by the input voice signal. Since broadband voice encoding is performed on the input voice signal, a broadband voice code is transmitted by using narrowband transmission bandwidth, thereby improving the cost performance of voice signal transmission.

Figure 4:
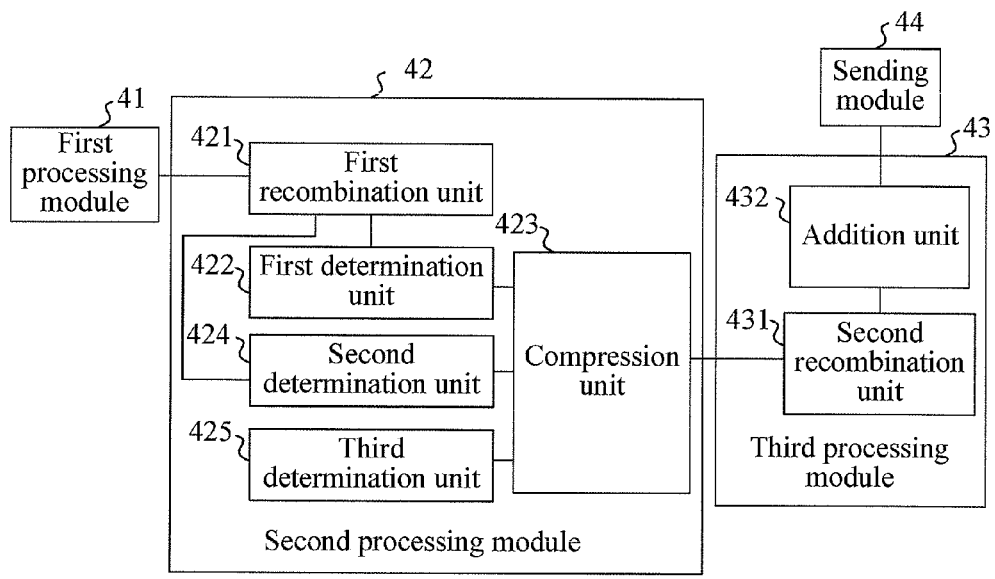
FIG. 4 is a schematic structural diagram of another embodiment of a voice signal encoding device of the present invention.

FIG. 4 is a schematic structural diagram of another embodiment of a voice signal encoding device of the present invention. As shown in FIG. 4, this embodiment includes a first processing module 41, a second processing module 42, a third processing module 43, and a sending module 44.

The first processing module 41 encodes an input voice signal to obtain a broadband code stream, where the broadband code stream includes a core layer bit stream and an extension enhancement layer bit stream. The second processing module 42 compresses the core layer bit stream to obtain a compressed code stream. The third processing module 43 packs the compressed code stream and the extension enhancement layer bit stream to obtain a packed code stream. The sending module 44 sends the packed voice code stream to a network or a storage.

Furthermore, the second processing module 42 may further include a first recombination unit 421, a first determination unit 422, a compression unit 423, a second determination unit 424, and a third determination unit 425. The first recombination unit 421 combines core layer bit streams in at least two frames to obtain a combined core layer bit stream. The first determination unit 422 determines frame length information during lossless compression performed on a data packet. The compression unit 423 performs lossless compression on the data packet by using the frame length information, to obtain the compressed code stream.

Furthermore, when a packet length of the data packet to be processed is less than or equal to a longest frame length during the lossless compression, if the packet length of the data packet is equal to an available frame length during the lossless compression, the first determination unit 422 determines that a frame length during the lossless compression is the packet length of the data packet; if the packet length of the data packet is not equal to an available frame length during the lossless compression, the first determination unit 422 determines that a frame length processed currently is a longest available frame length less than the packet length of the data packet to be processed.

If a packet length of the data packet to be processed is greater than a longest frame length during the lossless compression, the first determination unit 422 determines that a frame length processed currently is the longest frame length during the lossless compression; or determines that a frame length processed currently is a second longest frame length corresponding to the longest frame length during the lossless compression.

Furthermore, the second determination unit 424 determines a frame length of a first frame during the lossless compression. If the packet length of the data packet is an integral multiple of the frame length of the first frame, the second determination unit 424 determines that the frame length of the remaining frames during the lossless compression is the frame length of the first frame. When the packet length of the data packet is not an integral multiple of the frame length of the first frame, if the packet length of the data packet to be processed is greater than or equal to the frame length of the first frame, the second determination unit 424 determines that the frame length processed currently is equal to the frame length of the first frame; if the packet length of the data packet to be processed is less than the frame length of the first frame, the second determination unit 424 determines that the frame length processed currently is the longest available frame length less than the packet length of the data packet to be processed.

Furthermore, the third determination unit 425 determines frame length information during lossless compression performed on the data packet, according to a type of a voice transmission network and/or a type of the input voice signal.

Furthermore, the third processing module 43 may further include a second recombination unit 431 and an addition unit 432. The second recombination unit 431 recombines the compressed code stream and the extension enhancement layer bit stream to form a recombined code stream. The addition unit 432 adds header information including side information into the recombined code stream to obtain the packed voice code stream.

In the voice signal encoding device provided by the embodiment of the present invention, the second processing module 42 compresses the core layer bit stream, and the third processing module 43 packs the compressed code stream and the extension enhancement layer bit stream, thereby reducing transmission bandwidth occupied by the input voice signal. Since broadband voice encoding is performed on the input voice signal, a broadband voice code is transmitted by using narrowband transmission bandwidth, thereby improving the cost performance of voice signal transmission.

Figure 5:
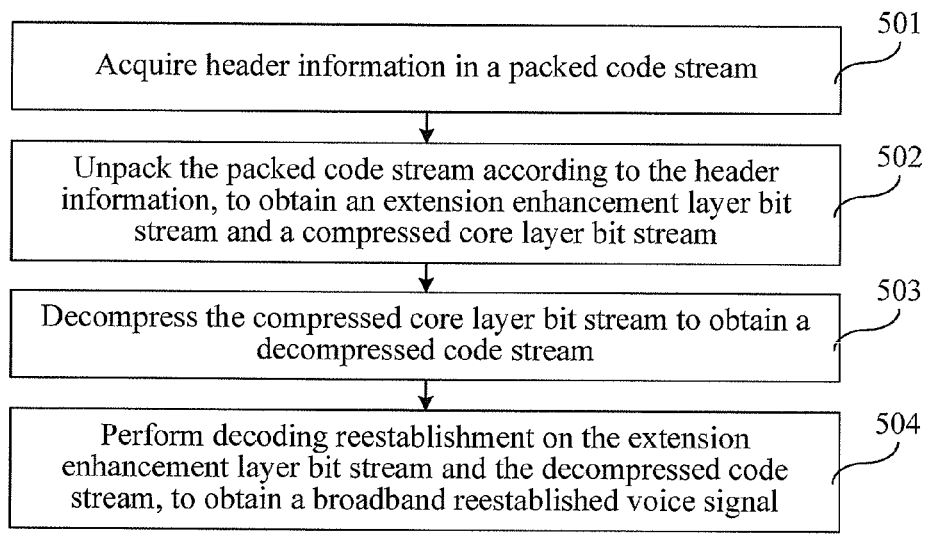
FIG. 5 is a schematic flow chart of an embodiment of a voice signal decoding method of the present invention.

FIG. 5 is a schematic flow chart of an embodiment of a voice signal decoding method of the present invention. As shown in FIG. 5, the embodiment of the present invention includes the following steps.

Step 501: Acquire header information in a packed code stream.

Step 502: Unpack the packed code stream according to the header information, to obtain an extension enhancement layer bit stream and a compressed core layer bit stream.

Step 503: Decompress the compressed core layer bit stream to obtain a decompressed code stream.

Step 504: Perform decoding reestablishment on the extension enhancement layer bit stream and the decompressed code stream, to obtain a broadband reestablished voice signal.

In the voice signal decoding method provided by the embodiment of the present invention, the packed code stream is unpacked to obtain the extension enhancement layer bit stream and the compressed core layer bit stream, and the compressed core layer bit stream is decompressed to obtain the decompressed code stream, so as to implement the effect of transmitting broadband voice by using narrowband transmission bandwidth, thereby improving the cost performance of voice signal transmission.

Figure 6:
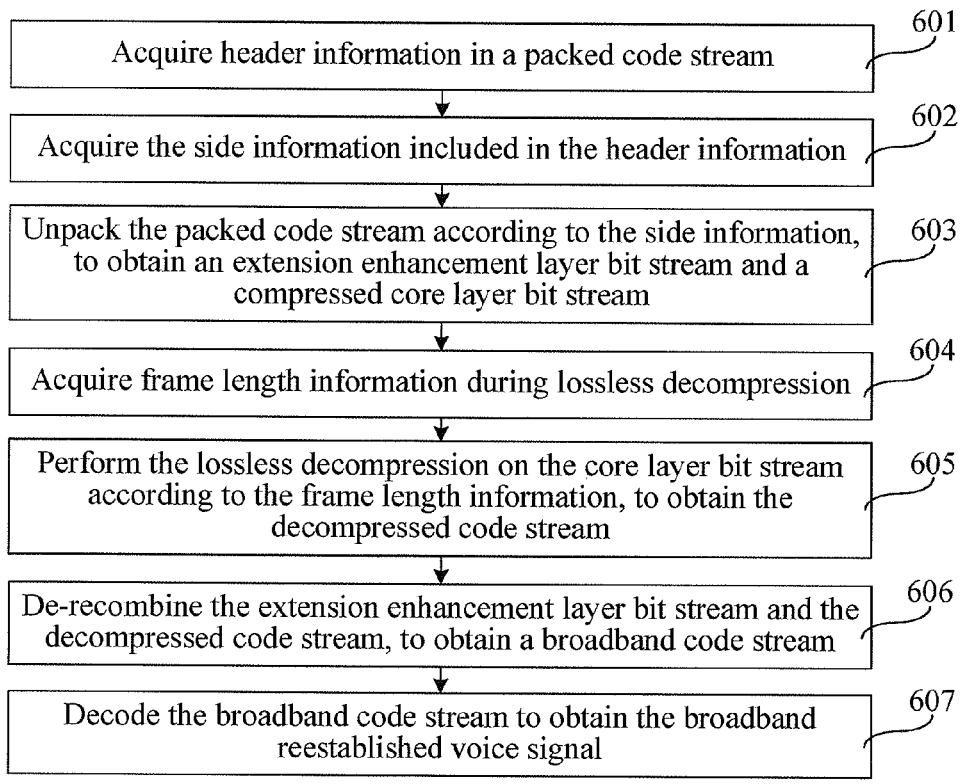
FIG. 6 is a schematic flow chart of another embodiment of a voice signal decoding method of the present invention.

FIG. 6 is a schematic flow chart of another embodiment of a voice signal decoding method of the present invention. As shown in FIG. 6, the embodiment of the present invention includes the following steps.

Step 601: Acquire header information in a packed code stream.

The header information includes side information. In an actual application, the side information may include header information in the RTP, and may also include payload header information (Payload Header) in the RTP, where the payload header information may be encoding mode information of a G.711.1 encoder.

Step 602: Acquire the side information included in the header information.

Step 603: Unpack the packed code stream according to the side information, to obtain an extension enhancement layer bit stream and a compressed core layer bit stream.

Step 604: Acquire frame length information during lossless decompression.

In the case in which a code stream of multiple frames is packed into a data packet, a decoding end may perform decoding by using information which is carried in the header information and which can be used for calculating a packet length of the data packet and the number of frames included in a packet, to obtain a processing frame length at each time of lossless decoding in the data packet.

Step 605: Perform the lossless decompression on the core layer bit stream according to the frame length information, to obtain the decompressed code stream.

Step 606: De-recombine the extension enhancement layer bit stream and the decompressed code stream, to obtain a broadband code stream.

Step 607: Decode the broadband code stream to obtain the broadband reestablished voice signal.

In this embodiment, the core layer code stream may be specifically a narrowband voice code stream. The narrowband voice code stream is obtained by encoding a narrowband signal. The extension enhancement layer bit stream may specifically include a narrowband enhancement bit stream and/or a broadband enhancement bit stream. The narrowband enhancement bit stream may be specifically an enhancement bit stream with narrowband voice encoding quality. The broadband enhancement bit stream may be specifically an enhancement bit stream with broadband voice encoding quality.

In the voice signal decoding method provided by the embodiment of the present invention, the packed code stream is unpacked to obtain the extension enhancement layer bit stream and the compressed core layer bit stream, and the compressed core layer bit stream is decompressed to obtain the decompressed code stream, so as to implement the effect of transmitting broadband voice by using narrowband transmission bandwidth, thereby improving the cost performance of voice signal transmission.

Figure 7:
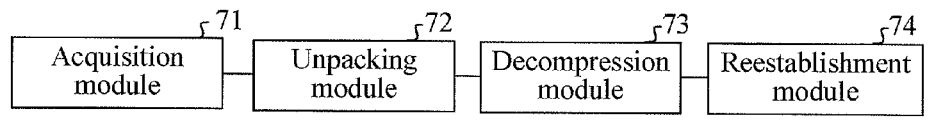
FIG. 7 is a schematic structural diagram of an embodiment of a voice signal decoding device of the present invention.

FIG. 7 is a schematic structural diagram of an embodiment of a voice signal decoding device of the present invention. As shown in FIG. 7, this embodiment includes an acquisition module 71, an unpacking module 72, a decompression module 73 and a reestablishment module 74.

The acquisition module 71 acquires header information in a packed code stream. The unpacking module 72 unpacks the packed code stream according to the header information to obtain an extension enhancement layer bit stream and a compressed core layer bit stream. The decompression module 73 decompresses the compressed core layer bit stream to obtain a decompressed code stream. The reestablishment module 74 performs decoding reestablishment on the extension enhancement layer bit stream and the decompressed code stream, to obtain a broadband reestablished voice signal.

In the voice signal decoding device provided by the embodiment of the present invention, the unpacking module 72 unpacks the packed code stream to obtain the extension enhancement layer bit stream and the compressed core layer bit stream, and the decompression module 73 decompresses the compressed core layer bit stream to obtain the decompressed code stream, so as to implement the effect of transmitting broadband voice by using narrowband transmission bandwidth, thereby improving the cost performance of voice signal transmission.

Figure 8:
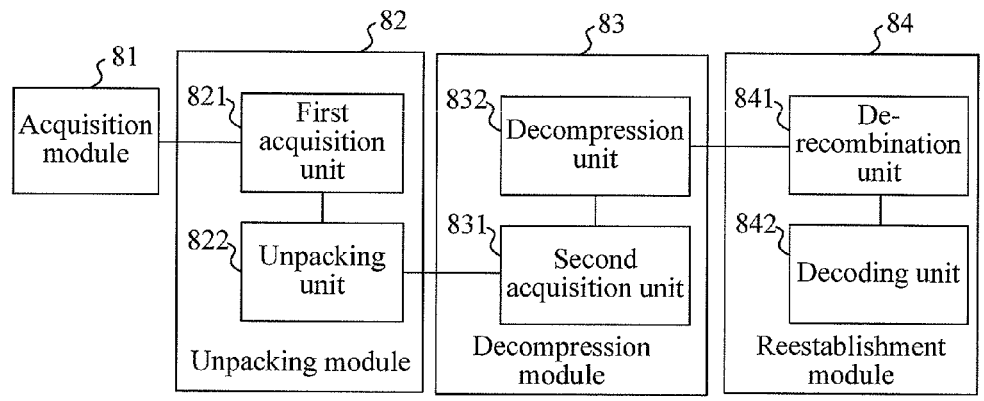
FIG. 8 is a schematic structural diagram of another embodiment of a voice signal decoding device of the present invention.

FIG. 8 is a schematic structural diagram of another embodiment of a voice signal decoding device of the present invention. As shown in FIG. 8, this embodiment includes an acquisition module 81, an unpacking module 82, a decompression module 83 and a reestablishment module 84.

The acquisition module 81 acquires header information in a packed code stream. The unpacking module 82 unpacks the packed code stream according to the header information to obtain an extension enhancement layer bit stream and a compressed core layer bit stream. The decompression module 83 decompresses the compressed core layer bit stream, to obtain a decompressed code stream. The reestablishment module 84 performs decoding reestablishment on the extension enhancement layer bit stream and the decompressed code stream, to obtain a broadband reestablished voice signal.

Furthermore, the unpacking module 82 may further include a first acquisition unit 821 and an unpacking unit 822. The first acquisition unit 821 acquires side information included in the header information. The unpacking unit 822 unpacks the packed code stream according to the side information, to obtain the extension enhancement layer bit stream and the compressed core layer bit stream.

Furthermore, the decompression module 83 may further include a second acquisition unit 831 and a decompression unit 832. The second acquisition unit 831 acquires frame length information during lossless decompression. The decompression unit 832 performs the lossless decompression on the core layer bit stream according to the frame length information, to obtain the decompressed code stream.

Furthermore, the reestablishment module 84 may further include a de-recombination unit 841 and a decoding unit 842. The de-recombination unit 841 de-recombines the extension enhancement layer bit stream and the decompressed code stream, to obtain a broadband code stream. The decoding unit 842 decodes the broadband code stream, to obtain the broadband reestablished voice signal.

In the voice signal decoding device provided by the embodiment of the present invention, the unpacking module 82 unpacks the packed code stream to obtain the extension enhancement layer bit stream and the compressed core layer bit stream, and the decompression module 83 decompresses the compressed core layer bit stream to obtain the decompressed code stream, so as to implement the effect of transmitting broadband voice by using narrowband transmission bandwidth, thereby improving the cost performance of voice signal transmission.

Figure 9:
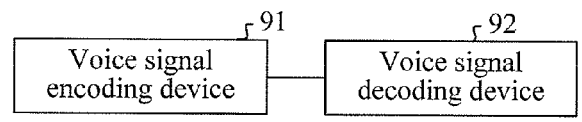
FIG. 9 is a schematic structural diagram of an embodiment of a voice codec system of the present invention.

FIG. 9 is a schematic structural diagram of an embodiment of a voice codec system of the present invention. As shown in FIG. 9, this embodiment includes a voice signal encoding device 91 and a voice signal decoding device 92.

The voice signal encoding device 91 encodes an input voice signal to obtain a broadband code stream, where the broadband code stream includes a core layer bit stream and an extension enhancement layer bit stream; compresses the core layer bit stream to obtain a compressed code stream; packs the compressed code stream and the extension enhancement layer bit stream to obtain a packed code stream; and sends the packed code stream to the voice signal decoding device 92.

The voice signal decoding device 92 acquires header information from the packed code stream sent by the voice signal encoding device 91; unpacks the packed code stream according to the header information to obtain the extension enhancement layer bit stream and a compressed core layer bit stream; decompresses the compressed core layer bit stream, to obtain a decompressed code stream; performs decoding reestablishment on the extension enhancement layer bit stream and the decompressed code stream, to obtain a broadband reestablished voice signal.

In the voice codec system provided by the embodiment of the present invention, the voice signal encoding device 91 compresses the core layer bit stream, packs the compressed code stream and the extension enhancement layer bit stream, and sends the packed voice code stream to the voice signal decoding device 92, thereby reducing transmission bandwidth occupied by the input voice signal. Since the broadband voice encoding is performed on the input voice signal, a broadband voice code stream is transmitted by using narrowband transmission bandwidth, thereby improving the cost performance of voice signal transmission.

In order to illustrate the technical solution of the embodiment of the present invention more clearly, the codec system applicable in the embodiment of the present invention is described in detail below.

Figure 10:
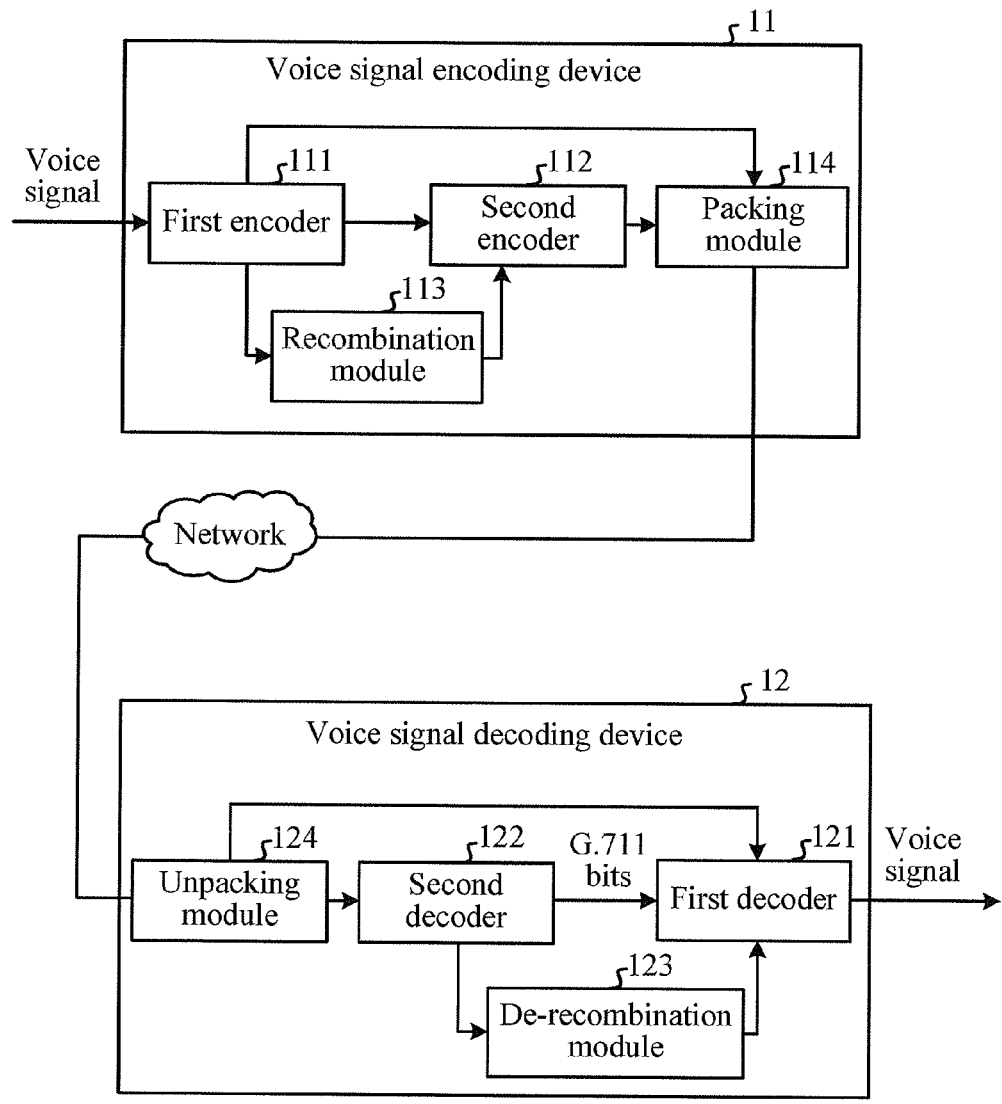
FIG. 10 is a schematic structural diagram of a system applicable in an embodiment of the present invention.

FIG. 10 is a schematic structural diagram of a system applicable in an embodiment of the present invention. As shown in FIG. 10, in this embodiment, an encoding end includes a voice signal encoding device 11 in the embodiment shown in FIG. 9, and a decoding end includes a voice signal decoding device 12 in the embodiment shown in FIG. 9. The voice signal encoding device 11 includes a first encoder 111, a second encoder 112, a recombination module 113, and a packing module 114. The voice signal decoding device 12 includes a first decoder 121, a second decoder 122, a de-recombination module 123, and an unpacking module 124.

At the encoding end, the first encoder 111 performs broadband voice encoding on an input voice signal to obtain a broadband voice code stream, where the broadband voice code stream includes a core layer bit stream and an extension enhancement layer bit stream; the core layer bit stream is recombined by the recombination module 113, or the core layer bit stream is directly input into the second encoder 112 for lossless compression, to generate a losslessly compressed code stream; the packing module 114 packs the compressed code stream and the extension enhancement layer bit stream to obtain a packed voice code stream and transmits the packed voice code stream to the decoding end through a network. Specifically, if the first encoder 111 is a G.711.1 encoder and the second encoder 112 is a G.711.0 encoder, the core layer bit stream formed after the first encoder 111 encodes the input voice signal is a G.711 bit stream (bits), and the extension enhancement layer bit stream is a G.711.1 extension bit stream (ext bits). The G.711 bit stream (bits) is recombined by the recombination module 113 and then is input into the second encoder 112, and the second encoder 112 performs the lossless compression on the recombined G.711 bit stream (bits) to obtain a G.711.0 bit stream (bits). The packing module 114 packs the G.711.1 extension bit stream (ext bits) and the G.711.0 bit stream (bits) and then transmits the packed bit stream to the decoding end through the network.

At the decoding end, the unpacking module 124 unpacks the received voice code stream, to obtain the extension enhancement layer bit stream and a compressed core layer bit stream; the second decoder 122 decodes the compressed core layer bit stream, to obtain a decompressed code stream; the de-recombination module 123 de-recombines the extension enhancement layer bit stream and the decompressed code stream, to obtain a de-recombined code stream; the first decoder 12 performs corresponding decoding on the de-recombined code stream to restore the voice signal. Specifically, if the first decoder 121 is a G.711.1 decoder and the second decoder 122 is a G.711.0 decoder, the voice code stream is unpacked by the unpacking module 124 to obtain the G.711.0 bit stream and the G.711.1 extension bit stream (ext bits). The G.711.0 bit stream is decoded by the second decoder 122 to form the G.711 bit stream (bits) and the G.711.1 extension bit stream (ext bits). The G.711 bit stream (bits) is de-recombined by the de-recombination module 123 and then input into the first decoder 121. The first decoder 121 performs lossless decoding on the de-recombined code stream and the G.711.1 extension bit stream and then outputs the voice signal.

Figure 11:
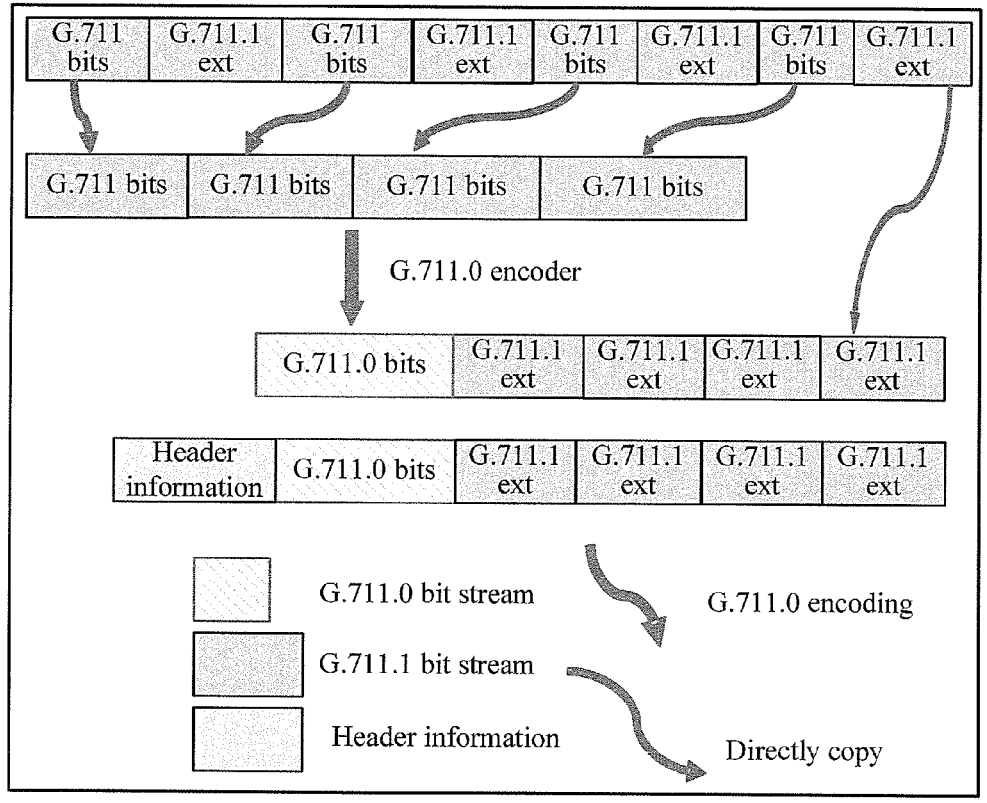
FIG. 11 is a schematic diagram of a code stream formed at an encoding end in the embodiment shown in FIG. 10.
Figure 12:
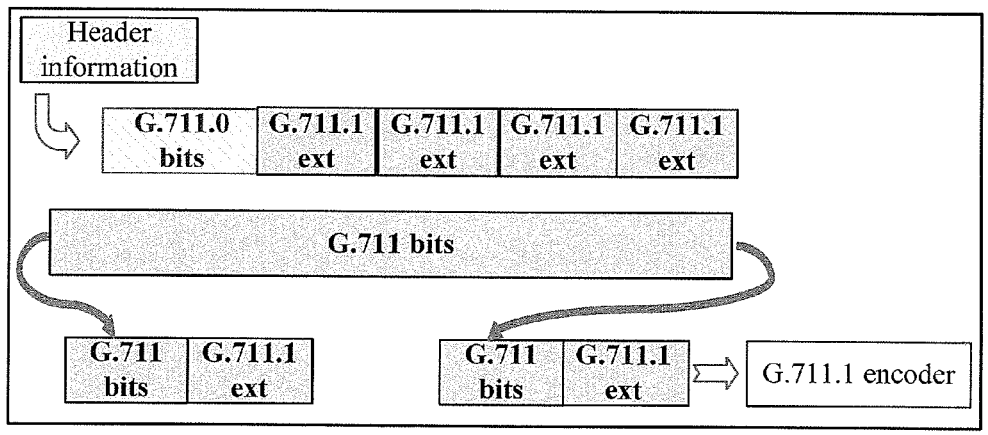
FIG. 12 is a schematic diagram of a code stream formed at a decoding end in the embodiment shown in FIG. 10.

FIG. 11 is a schematic diagram of a code stream formed at the encoding end in the embodiment shown in FIG. 10. FIG. 12 is a schematic diagram of a code stream formed at the decoding end in the embodiment shown in FIG. 10. This embodiment is exemplified by taking an example that four frames of data are packed into a data packet for illustration. Description is given in the following in combination with the embodiment shown in FIG. 10.

As shown in FIG. 11, at the encoding end, the input voice signal is encoded by the G.711.1 encoder to obtain the G.711.1 bit stream (G.711.1 bits). The G.711 bit streams of every four frames are combined together. The G.711.0 encoder compresses the combined G.711 bit stream in the order of time. Specifically, processing frame lengths of the G.711.0 encoder may be 5 ms, 10 ms, 20 ms, 30 ms, and 40 ms, and the longer the frame length of the G.711.0 encoder is, the higher a compression rate is. If two, four, six, and eight G.711 bit streams of 5 ms each are combined together according to a packet length and each are compressed by the G.711.0 encoder, corresponding frame lengths of the G.711.0 encoder are 10 ms, 20 ms, 30 ms, and 40 ms respectively. In this case, according to the packet length of the data packet and the compression characteristics of the G.711.0 for different frame lengths, a frame length $fl_1$ of a first frame can be set, and then according to the frame length $fl_1$ of the first frame in the order of time, the combined G.711 bit stream is encoded by using the G.711.0 encoder. When a data length of the G.711 bit stream to be processed is less than the frame length $fl_1$ of the first frame, a longest frame length (the frame length is a second longest frame length in this embodiment) in applicable frame lengths less than the remaining packet lengths may be selected. The processing is performed according to this principle until all data processing ends, which may be expressed by the following formulas. When the packet length of the data packet is less than or equal to 40 ms, the frame length $fl_1$ of the first frame is determined according to $$fl_{1_{pl \leq 40}}(pl) = \begin{cases} pl, N = 1, \text{ if } pl = 5, 10, 20, 30, 40 \\ pl - 5, N = 2, \text{ if } pl < 40 \text{ and } pl \neq 5, 10, 20, 30 \end{cases},$$

so the frame length $fl_1$ of the first frame and the number N of frames during the lossless compression performed by the G.711.0 encoder can be determined according to the packet length of the data packet. When the packet length pl of the data packet is greater than 40 ms, $$fl_{1_{pl>40}} = \begin{cases} 30, N = \left\lfloor \frac{pl}{30} \right\rfloor + fl_{1_{pl \leq 40}}\left(pl - \left\lfloor \frac{pl}{30} \right\rfloor \times 30\right) \\ 40, N = \left\lfloor \frac{pl}{40} \right\rfloor + fl_{1_{pl \leq 40}}\left(pl - \left\lfloor \frac{pl}{40} \right\rfloor \times 40\right) \end{cases},$$

where $\lfloor . \rfloor$ is a round-down operator. In this case, whether to select 30 or select 40 can be determined by calculating the number of bits saved by the whole data packet, so as to acquire a frame length with which more bits are saved. Moreover, the calculation may be performed according to actual conditions or performed through empirical value estimate.

In the foregoing example, the frame length $fl_1$ of the first frame of the G.711.0 encoder is 20 ms (four frames), so that bandwidth can be saved as much as possible. If in an actual application, for example, in a conference call application system, only a narrowband G.711 bit stream is required, it is easier to truncate a code stream.

After the G.711.0 bit stream and the G.711.1 extension bit stream are combined, header information including side information is added into the combined code stream, and the code stream is input into a transmission network or a storage. The side information may include a G.711.1 Payload Header (including encoding mode information) and RTP packet header information. Moreover, the side information may also include information that can be used for calculating a packet length pl and the number N of frames during the lossless compression.

As shown in FIG. 12, at a receiving end, the side information is acquired from a packet header. The G.711.0 decoder decodes, based on the side information, the G.711.0 bit stream in the voice code stream, to obtain the G.711 bit stream, where the processing frame length of the G.711.0 decoder is consistent with that at the encoding end. The G.711 bit stream is divided into independent 5 ms frames. The G.711 bit stream and the G.711.1 extension bit stream of each frame are combined as a G.711.1 code stream. The G.711.1 code stream is decoded by the G.711.1 decoder to obtain a reestablished voice.

Figure 13:
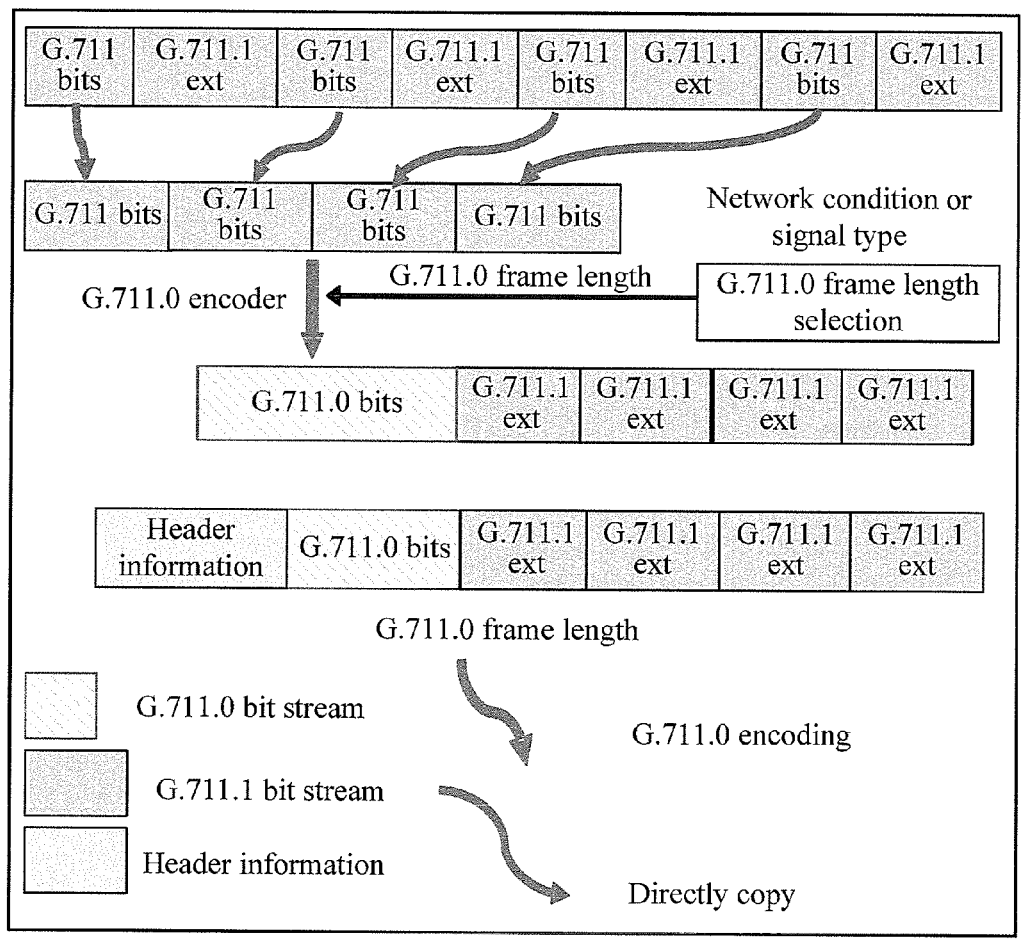
FIG. 13 is another schematic diagram of a code stream formed at an encoding end in the embodiment shown in FIG. 10.
Figure 14:
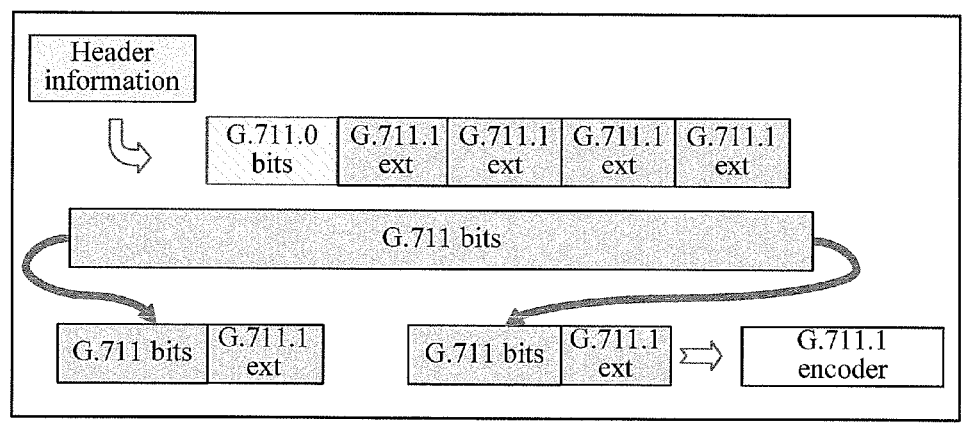
FIG. 14 is another schematic diagram of a code stream formed at a decoding end in the embodiment shown in FIG. 10.

FIG. 13 is another schematic diagram of a code stream formed at the encoding end in the embodiment shown in FIG. 10. FIG. 14 is another schematic diagram of a code stream formed at the decoding end in the embodiment shown in FIG. 10. This embodiment is exemplified by taking an example that four frames of data are packed into a data packet for illustration. Description is given in the following in combination with the embodiment shown in FIG. 10.

As shown in FIG. 13, at the encoding end, the input voice signal is encoded by the G.711.1 encoder to obtain the G.711.1 bit stream. The G.711 bit streams of all frames are combined together. The G.711.0 encoder compresses the combined G.711 bit stream in the order of time. Processing frame lengths of the G.711.0 encoder may be 5 ms, 10 ms, 20 ms, 30 ms, and 40 ms, and the longer the frame length of the G.711.0 is, the higher a compression rate is.

If two, four, six, and eight G.711 bit streams of 5 ms each are combined together and each are compressed by the G.711.0 encoder, that is, corresponding frame lengths of the G.711.0 encoder are 10 ms, 20 ms, 30 ms, and 40 ms, the bit stream is further compressed to reduce bandwidth occupation. For example, a frame length less than a packet length is selected as a frame length $fl_1$ of a first frame, and then the combined G.711 bit stream is encoded by the G.711.0 encoder according to the frame length $fl_1$ of the first frame in the order of time. When a data length of the G.711 bit stream to be processed is less than the frame length $fl_1$ of the first frame, a longest frame length in frame lengths less than the data length of the G.711 bit stream may be selected. Processing is performed according to this principle until all data processing ends. For example, the frame length $fl_1$ of the first frame is expressed by the following formula:

$$\begin{cases} \text{when } pl \text{ can be divided exactly by } fl_1 : N = \frac{pl}{fl_1}; \\ fl_n = fl_1, n \in [1, N]; \\ \text{when } pl \text{ cannot be divided exactly by } fl_1 : \\ N = \left\lfloor \frac{pl}{fl_1} \right\rfloor + fl_{1pl<=40}\left(\left(pl - \left\lfloor \frac{pl}{fl_1} \right\rfloor \Box fl_1\right)\right); \\ fl_n = fl_1, n \in \left[1, \left\lfloor \frac{pl}{fl_1} \right\rfloor\right]; \\ fl_n = fl_{1pl<=40}\left(\left(pl - \left\lfloor \frac{pl}{fl_1} \right\rfloor \Box fl_1\right)\right), n \in \left[\left\lfloor \frac{pl}{fl_1} \right\rfloor + 1, N\right]; \end{cases}$$

this processing manner, bandwidth can be saved as much as possible, and moreover, if in an application, for example, in a conference call application system, only a narrowband G.711 bit stream is required, it is easier to truncate a code stream.

When the G.711 bit streams of 5 ms are combined together and each are compressed by the G.711.0 encoder at a frame length of 5 ms, if a bit error exists, more valid voice packets can be decoded. If in an actual application, for example, in the conference call application system, only a G.711 bit stream is required, it is easier to truncate a code stream.

The frame length to be processed by the G.711.0 encoder may also be adaptively determined according to a type of a voice transmission network or a type of the input voice signal. For example, the packet length of the data packet corresponding to the core layer bit streams combined by the combination module is 20 ms, where in a first 10 ms, the data is a silence signal, and in a second 10 ms, the data is a voice signal. In this case, compression is separately performed on the first 10 ms data, which can obtain larger compression efficiency. Therefore, the G.711.0 encoder can use a frame length of 10 ms, so two data frames corresponding to the G.711.0 encoder are formed. Moreover, if a lot of bit errors exist in network transmission, a short frame is adopted as much as possible; otherwise, a long frame is adopted as much as possible. If a signal type is silence, the long frame may be adopted, and if the signal type is a voice, the short frame may be adopted.

After the G.711.0 bit stream and the G.711.1 extension bit stream are combined, a header including side information is added into the combined code stream, and the code stream is input into a transmission network. The side information may include the Payload Header (including encoding mode information) of a G.711.1 encoder and RTP packet header information. Moreover, the side information may also include information that can be used for calculating a packet length pl, the number N of frames during the lossless compression and so on.

As shown in FIG. 14, at the receiving end, the side information is acquired from the header information, where the side information may include G.711.1 encoding mode information, RTP header information, or G.711.0 encoding frame length information, and the side information may also be acquired from the SDP. The G.711.0 encoding frame length information is obtained based on the side information, and the G.711.0 decoder decodes the G.711.0 bit stream in the input code stream, to obtain the G.711 bit stream. The processing frame length of the G.711.0 decoder is consistent with that at the encoding end. The G.711 bit stream is divided into independent 5 ms frames. The G.711 bit stream and the G.711.1 extension bit stream of each frame are combined as the G.711.1 code stream. The G.711.1 code stream is decoded by the G.711.1 decoder to obtain a reestablished voice.

Figure 15:
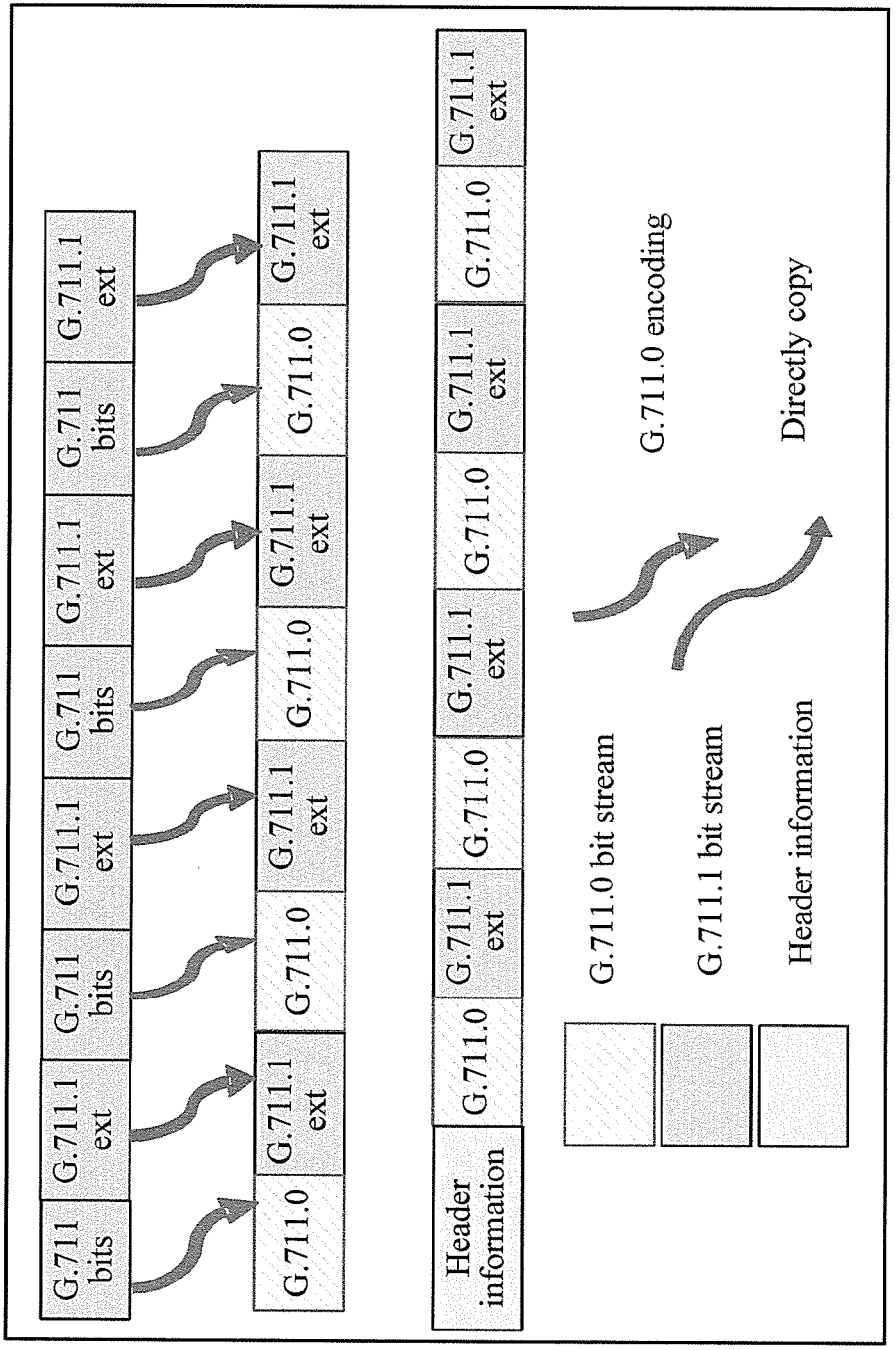
FIG. 15 is yet another schematic diagram of a code stream formed at an encoding end in the embodiment shown in FIG. 10.
Figure 16:
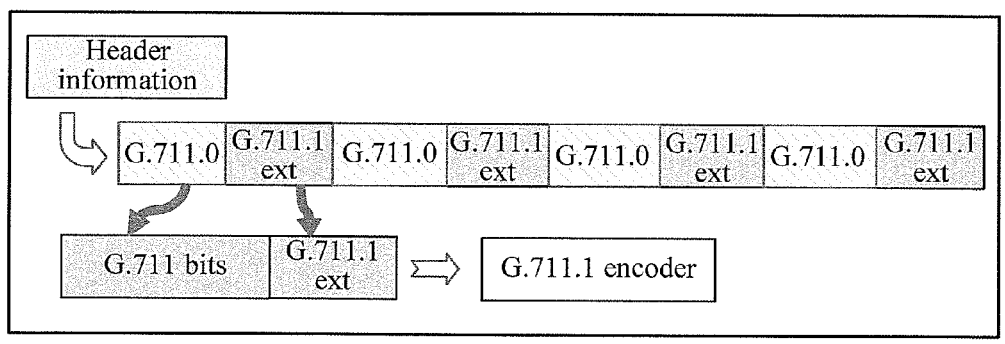
FIG. 16 is yet another schematic diagram of a code stream formed at a decoding end in the embodiment shown in FIG. 10.

FIG. 15 is yet another schematic diagram of a code stream formed at the encoding end in the embodiment shown in FIG. 10. FIG. 16 is yet another schematic diagram of a code stream formed at the decoding end in the embodiment shown in FIG. 10. This embodiment is exemplified by taking an example that four frames of data are packed into a data packet for illustration. Description is given in the following in combination with the embodiment shown in FIG. 10.

As shown in FIG. 15, at the encoding end, the input voice signal is encoded by the G.711.1 encoder to obtain the G.711.1 code stream. The G.711.0 encoder compresses the G.711 bit streams in the G.711.1 code stream at the frame length of 5 ms in the order of time. The G.711.0 bit stream and the G.711.1 extension bit stream are combined and packed into a data packet. Header information including side information is added into the data packet, and the data packet is input into a transmission network. The side information may include a G.711.1 Payload Header (including encoding mode information), and RTP packet header information. Moreover, the side information may also include information that can be used for calculating a packet length pl, the number N of frames during lossless compression, and so on.

As shown in FIG. 16, at the decoding end, the side information is acquired from the header information. The G.711.0 decoder decodes, based on the side information, the G.711.0 bit stream in the input code stream, to obtain the G.711 bit stream of one frame. The processing frame length of the G.711.0 decoder is 5 ms. The G.711 bit stream and the G.711.1 extension bit stream of one frame are combined as a G.711.1 code stream of one frame. The G.711.1 code stream is decoded by the G.711.1 decoder to obtain a reestablished voice. Moreover, the de-combination and decoding process may also be repeated until the data packet is null.

The embodiment shown in FIG. 10 to FIG. 16 is specifically applied to the G.711.0 encoder and the G.711.1 encoder and can make full use of the advantages of the G.711.0 encoder and the G.711.1 encoder. Through a voice encoding transmission solution with the combination of the G.711.0 encoder and the G.711.1 encoder, bandwidth is saved and broadband voice quality is provided, thereby improving the cost performance of voice transmission of a network system, and meanwhile taking account of algorithm complexity in the design of the solution.

Furthermore, the embodiment shown in FIG. 10 to FIG. 16 in which the first encoder is specifically the G.711.1 encoder and the second encoder is specifically the G.711.0 encoder is exemplified, but implementation of the embodiments of the present invention is not limited to the foregoing situation that the first decoder is specifically the G.711.1 decoder and the second decoder is specifically the G.711.0 decoder. As long as functions of the codec of the technical solutions described in the embodiments of the present invention is implemented through a corresponding codec, the corresponding codec belongs to the technical solutions described in the embodiments of the present invention.

It can be clearly understood by persons skilled in the art that, for the purpose of convenient and brief description, for the detailed working process of the foregoing system, apparatus, module, and unit, reference may be made to the corresponding process in the method embodiments, and details are not described herein again.

Persons of ordinary skill in the art should understand that all or a part of the steps in the embodiments may be implemented by a program instructing relevant hardware. The program may be stored in a computer readable storage medium. When the program runs, the steps of the method according to the embodiments are performed. The storage medium includes various media capable of storing program codes, such as a ROM, a RAM, a magnetic disk, or an optical disk.

Finally, it should be noted that the foregoing embodiments are merely provided for describing the technical solutions of the present invention, but not intended to limit the present invention. It should be understood by persons of ordinary skill in the art that though the present invention has been described in detail with reference to the exemplary embodiments, modifications or equivalent replacements can be made to the technical solutions of the present invention, as long as the modifications or equivalent replacements cannot make the modified technical solutions depart from the idea and scope of the technical solutions of the present invention.

What is claimed is:

1. A voice signal encoding method, comprising:
   encoding, with compression, an input voice signal to obtain a broadband code stream, wherein the broadband code stream comprises a core layer bit stream and an extension enhancement layer bit stream;
   compressing the core layer bit stream to obtain a compressed code stream;
   packing the extension enhancement layer bit stream and the compressed code stream to obtain a packed code stream; and
   wherein compressing the core layer bit stream to obtain the compressed code stream comprises:
      combining core layer bit streams in at least two data frames to obtain a data packet corresponding to a combined core layer bit stream,
      determining frame length information during lossless compression performed on the data packet, and
      performing the lossless compression on the data packet according to the frame length information, to obtain the compressed code stream;
   wherein:
   if a packet length of a data packet to be processed is less than or equal to a longest frame length during the lossless compression, determining the frame length information during the lossless compression performed on the data packet comprises:
      if the packet length of the data packet is equal to an available frame length during the lossless compression, determining frame length information during lossless compression performed on the data packet, or
      if the packet length of the data packet is not equal to an available frame length during the lossless compression, determining that a frame length processed currently is a longest available frame length less than the packet length of the data packet to be processed; and
   if a packet length of a data packet to be processed is greater than a longest frame length during the lossless compression, determining the frame length information during the lossless compression performed on the data packet comprises:
      determining that a frame length processed currently is the longest frame length during the lossless compression, or
      determining that a frame length processed currently is a second longest frame length corresponding to the longest frame length during the lossless compression.

2. The method according to claim 1, wherein determining the frame length information during the lossless compression performed on the data packet comprises:
   determining the frame length information during the lossless compression performed on the data packet according to a compression characteristic corresponding to each frame length during the lossless compression and a packet length of the data packet.

3. A voice signal encoding method, comprising:
   encoding, with compression, an input voice signal to obtain a broadband code stream, wherein the broadband code stream comprises a core layer bit stream and an extension enhancement layer bit stream;
   compressing the core layer bit stream to obtain a compressed code stream;
   packing the extension enhancement layer bit stream and the compressed code stream to obtain a packed code stream; and
   wherein compressing the core layer bit stream to obtain the compressed code stream comprises:
      combining core layer bit streams in at least two data frames to obtain a data packet corresponding to a combined core layer bit stream, determining frame length information during lossless compression performed on the data packet, and performing the lossless compression on the data packet according to the frame length information, to obtain the compressed code stream;

wherein determining the frame length information during the lossless compression performed on the data packet comprises:

determining a frame length of a first frame during the lossless compression;

when a packet length of the data packet is an integral multiple of the frame length of the first frame, determining that a frame length of remaining frames during the lossless compression is the frame length of the first frame; and when a packet length of the data packet is not an integral multiple of the frame length of the first frame, if the packet length of the data packet to be processed is greater than or equal to the frame length of the first frame, determining that a frame length processed currently is equal to the frame length of the first frame, or if the packet length of the data packet to be processed is less than the frame length of the first frame, determining that a frame length processed currently is a longest available frame length less than the packet length of the data packet to be processed.

4. A voice signal encoding device, comprising:

a first processing module, configured to encode, with compression, an input voice signal to obtain a broadband code stream, wherein the broadband code stream comprises a core layer bit stream and an extension enhancement layer bit stream;

a second processing module, configured to compress the core layer bit stream to obtain a compressed code stream;

a third processing module, configured to pack the extension enhancement layer bit stream and the compressed code stream to obtain a packed code stream; and wherein the second processing module comprises:

a first recombination unit, configured to combine core layer bit streams in at least two data frames to obtain a combined core layer bit stream, a first determination unit, configured to determine frame length information during lossless compression performed on a data packet, and a compression unit, configured to perform the lossless compression on the data packet according to the frame length information, to obtain the compressed code stream;

when a packet length of the data packet to be processed is less than or equal to a longest frame length during the lossless compression, if the packet length of the data packet to be processed is equal to an available frame length during the lossless compression, the first determination unit is configured to determine that a frame length during the lossless compression is the packet length of the data packet; or if the packet length of the data packet to be processed is not equal to an available frame length during the lossless compression, the first determination unit is configured to determine that a frame length processed currently is a longest available frame length less than the packet length of the data packet to be processed; and when a packet length of the data packet to be processed is greater than a longest frame length during the lossless compression, the first determination unit is configured to:

determine that a frame length processed currently is the longest frame length during the lossless compression, or determine that a frame length processed currently is a second longest frame length corresponding to the longest frame length during the lossless compression.

5. The device according to claim 4, wherein the second processing module comprises a third determination unit configured to determine the frame length information during the lossless compression performed on the data packet, according to a type of a voice transmission network or a type of the input voice signal.

6. The device according to claim 4, wherein the third processing module comprises:

a second recombination unit, configured to recombine the compressed code stream and the extension enhancement layer bit stream to form a recombined code stream; and an addition unit, configured to add header information comprising side information into the recombined code stream, to obtain the packed code stream.

7. A voice signal encoding device, comprising:

a first processing module, configured to encode, with compression, an input voice signal to obtain a broadband code stream, wherein the broadband code stream comprises a core layer bit stream and an extension enhancement layer bit stream;

a second processing module, configured to compress the core layer bit stream to obtain a compressed code stream;

a third processing module, configured to pack the extension enhancement layer bit stream and the compressed code stream to obtain a packed code stream; and wherein the second processing module comprises:

a first recombination unit, configured to combine core layer bit streams in at least two data frames to obtain a combined core layer bit stream, a first determination unit, configured to determine frame length information during lossless compression performed on a data packet, a compression unit, configured to perform the lossless compression on the data packet according to the frame length information, to obtain the compressed code stream, and a second determination unit, configured to determine frame length information of a first frame during lossless compression;

when a packet length of the data packet is an integral multiple of a frame length of the first frame, the second determination unit is configured to determine that a frame length of remaining frames during the lossless compression is the frame length of the first frame;

when a packet length of the data packet to be processed is not an integral multiple of a frame length of the first frame, the second determination unit is configured to:

if the packet length of the data packet to be processed is greater than or equal to the frame length of the first frame, determine that a frame length processed currently is equal to the frame length of the first frame, or if the packet length of the data packet to be processed is less than the frame length of the first frame, determine that a frame length processed currently is a longest available frame length less than the packet length of the data packet to be processed.

* * * * *